(12) United States Patent
Choi et al.

(10) Patent No.: US 10,277,359 B2
(45) Date of Patent: Apr. 30, 2019

(54) RECEIVER, METHOD FOR CANCELLING INTERFERENCE THEREOF AND TRANSMITTER FOR THE SAME

(71) Applicant: Samsung Electronics Co., Ltd., Gyeonggi-do (KR)

(72) Inventors: Jongsoo Choi, Surrey (GB); Byoung Jo Choi, Incheon (KR); Seung Hoon Hwang, Seoul (KR); Eun Sun Hwang, Incheon (KR)

(73) Assignees: Samsung Electronics Co., Ltd (KR); Dongguk University Industry-Academic Cooperation Foundation (KR)

( * ) Notice: Subject to any disclaimer, the term of this patent is extended or adjusted under 35 U.S.C. 154(b) by 0 days.

(21) Appl. No.: 14/858,446

(22) Filed: Sep. 18, 2015

(65) Prior Publication Data

US 2016/0013884 A1  Jan. 14, 2016

Related U.S. Application Data

(63) Continuation of application No. 13/263,006, filed as application No. PCT/KR2010/002084 on Apr. 6, 2010, now Pat. No. 10,128,978.

(30) Foreign Application Priority Data

Apr. 7, 2009  (KR) ........................ 10-2009-0030075

(51) Int. Cl.
  *H04B 1/12*   (2006.01)
  *H04L 1/00*   (2006.01)
  *H04L 27/20*  (2006.01)

(52) U.S. Cl.
  CPC ............. *H04L 1/003* (2013.01); *H04B 1/123* (2013.01); *H04L 27/2017* (2013.01)

(58) Field of Classification Search
  None
  See application file for complete search history.

(56) References Cited

U.S. PATENT DOCUMENTS 5,410,750 A   4/1995  Cantwell et al.
5,625,646 A   4/1997  Goodson et al.
(Continued)

FOREIGN PATENT DOCUMENTS

EP   1037437 A2 *  9/2000  ........... H04L 1/0003
EP   1037437 A2 *  9/2000  ........... H04L 1/0003
(Continued)

OTHER PUBLICATIONS

GP-070214, Voice Capacity Evolution with Orthogonal Sub Channel, Nokia G1, 3GPP GERAN#33, Feb. 2007.*
(Continued)

*Primary Examiner* — Berhanu Tadese
(74) *Attorney, Agent, or Firm* — The Farrell Law Firm, P.C.

(57) ABSTRACT

A method and apparatus for receiving feedback information of a transmitter in a mobile communication system are provided. The method includes determining a parameter related to a first user signal; transmitting the first user signal based on the parameter related to the first user signal to a receiver; and receiving feedback information associated with the first user signal and an interference signal based on the first user signal.

8 Claims, 12 Drawing Sheets

(a)

(b)

(c)

(56) References Cited

U.S. PATENT DOCUMENTS

| | | | |
|---|---|---|---|
| 5,815,529 A | 9/1998 | Wang | |
| 5,956,624 A | 9/1999 | Hunsinger et al. | |
| 6,473,506 B1* | 10/2002 | Hook | H04L 5/12 375/308 |
| 6,522,702 B1 | 2/2003 | Maruyama | |
| 6,647,071 B2 | 11/2003 | Sommer et al. | |
| 6,831,954 B1 | 12/2004 | Mandyam | |
| 6,996,164 B1 | 2/2006 | Blount et al. | |
| 7,079,607 B2 | 7/2006 | Brunel | |
| 7,418,248 B2 | 8/2008 | Maeda et al. | |
| 7,463,673 B2 | 12/2008 | Fujii et al. | |
| 7,469,491 B2 | 12/2008 | McCallister et al. | |
| 7,496,164 B1* | 2/2009 | Mostafa | H04B 17/345 375/254 |
| 7,830,975 B2* | 11/2010 | Kuchi | H04L 27/22 375/267 |
| 8,031,794 B2* | 10/2011 | Mostafa | H04B 7/0857 375/267 |
| 8,243,861 B2* | 8/2012 | Mostafa | H04B 17/345 375/254 |
| 8,290,098 B2 | 10/2012 | Onggosanusi et al. | |
| 8,374,156 B2* | 2/2013 | Yu | H04L 5/0007 370/252 |
| 8,705,411 B2* | 4/2014 | Yu | H04L 5/0048 370/203 |
| 8,902,862 B2* | 12/2014 | Yu | H04L 5/0007 370/336 |
| 8,948,031 B2* | 2/2015 | Yu | H04L 5/0048 370/252 |
| 9,185,594 B2* | 11/2015 | Yu | H04L 5/0007 |
| 9,313,683 B2* | 4/2016 | Yu | H04L 5/0007 |
| 9,479,960 B2* | 10/2016 | Yu | H04L 5/0007 |
| 9,622,106 B2* | 4/2017 | Yu | H04L 5/0007 |
| 10,128,978 B2* | 11/2018 | Choi | H04B 1/123 |
| 2001/0028692 A1 | 10/2001 | Wiese et al. | |
| 2004/0266383 A1* | 12/2004 | Mattellini | H04L 25/03006 455/307 |
| 2005/0135230 A1* | 6/2005 | Yu | H04L 5/023 370/210 |
| 2005/0190821 A1* | 9/2005 | Fujii | H04B 7/15535 375/211 |
| 2005/0226344 A1* | 10/2005 | Kuchi | H04L 27/22 375/267 |
| 2005/0245220 A1* | 11/2005 | Maeda | H04B 1/12 455/203 |
| 2005/0286665 A1 | 12/2005 | Resheff et al. | |
| 2006/0066481 A1* | 3/2006 | Goldberg | H04B 7/08 342/378 |
| 2006/0198433 A1* | 9/2006 | Molev-Shteiman | H04L 1/005 375/229 |
| 2006/0203943 A1* | 9/2006 | Scheim | H04L 1/0045 375/341 |
| 2006/0205437 A1* | 9/2006 | Sung | H04L 25/0226 455/562.1 |
| 2006/0210003 A1* | 9/2006 | Yang | H04L 25/03019 375/350 |
| 2007/0025476 A1 | 2/2007 | Rasmussen et al. | |
| 2007/0041473 A1* | 2/2007 | Chen | H04L 27/0012 375/329 |
| 2007/0058709 A1* | 3/2007 | Chen | H04B 1/1027 375/231 |
| 2007/0070968 A1* | 3/2007 | Kawasaki | H04B 1/69 370/344 |
| 2007/0071069 A1 | 3/2007 | Miller | |
| 2007/0116162 A1 | 5/2007 | Eliaz et al. | |
| 2007/0127608 A1 | 6/2007 | Scheim et al. | |
| 2007/0165699 A1 | 7/2007 | Dabak et al. | |
| 2007/0263744 A1* | 11/2007 | Mostafa | H04B 7/0857 375/267 |
| 2008/0187076 A1* | 8/2008 | Wu | H04B 7/082 375/323 |
| 2008/0279270 A1* | 11/2008 | Zeng | H04L 25/03133 375/231 |
| 2009/0016465 A1* | 1/2009 | Ramesh | H04B 1/1027 375/324 |
| 2009/0052591 A1* | 2/2009 | Chen | H04L 25/03318 375/341 |
| 2009/0129492 A1* | 5/2009 | Hamaguchi | H04L 27/2634 375/260 |
| 2009/0135893 A1 | 5/2009 | Kent et al. | |
| 2009/0154620 A1* | 6/2009 | Mostafa | H04B 17/345 375/346 |
| 2009/0190548 A1* | 7/2009 | Niemela | H04L 27/0008 370/330 |
| 2010/0067440 A1* | 3/2010 | Dick | H04L 5/0053 370/328 |
| 2010/0159837 A1 | 6/2010 | Dent et al. | |
| 2010/0203854 A1* | 8/2010 | Yu | H04L 25/03834 455/127.1 |
| 2010/0278227 A1* | 11/2010 | Sikri | H04L 25/03292 375/232 |
| 2010/0302990 A1* | 12/2010 | Lopez | H04L 1/0003 370/312 |
| 2010/0311410 A1* | 12/2010 | Lennartson | H04B 17/318 455/423 |
| 2010/0323685 A1* | 12/2010 | Lopez | H04L 25/0212 455/422.1 |
| 2011/0007624 A1* | 1/2011 | Lopez | H04L 1/0003 370/203 |
| 2011/0077017 A1* | 3/2011 | Yu | H04L 5/0007 455/452.1 |
| 2011/0122852 A1* | 5/2011 | Yu | H04L 5/0007 370/337 |
| 2011/0134809 A1* | 6/2011 | Yu | H04L 5/0048 370/277 |
| 2011/0170482 A1* | 7/2011 | Dhanda | H04L 5/0048 370/328 |
| 2011/0255641 A1* | 10/2011 | Lopez | H04L 25/03006 375/343 |
| 2011/0267968 A1* | 11/2011 | Yu | H04L 5/0048 370/252 |
| 2012/0045010 A1* | 2/2012 | Choi | H04B 1/123 375/285 |
| 2013/0107749 A1* | 5/2013 | Yu | H04L 5/0007 370/252 |
| 2014/0010208 A1* | 1/2014 | Yu | H04L 5/0007 370/336 |
| 2014/0241412 A1* | 8/2014 | Kalbasi | H04L 25/03305 375/232 |
| 2016/0013884 A1* | 1/2016 | Choi | H04B 1/123 375/285 |
| 2016/0095014 A9* | 3/2016 | Yu | H04L 5/0007 370/330 |

FOREIGN PATENT DOCUMENTS

| | | |
|---|---|---|
| JP | 04-035546 | 2/1992 |
| JP | 2004-064682 | 2/2004 |
| JP | 2005-311901 | 11/2005 |
| JP | 2007-096740 | 4/2007 |

OTHER PUBLICATIONS

PCT/ISA/237 Written Opinion issued on PCT/KR2010/002084 dated Nov. 9, 2010 (4 pp.).

PCT/ISA/210 Search Report issued on PCT/KR2010/002084 dated Nov. 9, 2010 (3 pp.).

Korean Office Action dated Feb. 26, 2015 issued in counterpart application No. 10-2009-0030075.

Darp—New Receiver Technologies Boost Network Capacity_Rohde-Schwarz_Nov. 2005.

Meyer et al., "A Single Antenna Interference Cancellation Algorithm for GSM," VTC 2005-Spring. 2005 IEEE 61st, vol. 2, pp. 821-825, May-Jun. 2005.

Hoeher et al., "Single Antenna Interference Cancellation (SAIC) for Cellular TDMA Networks by Means of Joint Delayed-Decision Feedback Sequence Estimation," IEEE_TWC, vol. 5, pp. 1234-1237, Jun. 2006.

(56) References Cited

OTHER PUBLICATIONS

Xun Qiu, "Multiuser Detection for the Evolution of Speech Services N GSM," XR-EE-KT-2008-005 D4.
Chen Xiang et al, "Geran Evolution-Multi-User Reusing One Slot to Improve Capacity", ICCMC_IEEE 2009.
3GPP ETSI TR 145 914 V.8., GSM-EDGE Radio Access Network—GERAN, 2009.

* cited by examiner

RECEIVER, METHOD FOR CANCELLING INTERFERENCE THEREOF AND TRANSMITTER FOR THE SAME

PRIORITY

This application is a continuation application of U.S. patent application Ser. No. 13/263,006, which was filed in the U.S. Patent and Trademark Office on Oct. 5, 2011, as National Stage Entry PCT/KR2010/002084, and claims priority to Korean Application Serial No. 10-2009-0030075, which was filed in the Korean Intellectual Property Office on Apr. 7, 2009, the entire content of each of which is incorporated herein by reference.

BACKGROUND OF THE INVENTION

1. Field of the Invention

The present invention relates to a telecommunication method and apparatus, and more particularly, to a receiver, a method of canceling interference thereof and a transmitter for the same.

2. Description of the Related Art

Generally, user signals for a plurality of transceivers exist in communications environment. At this time, the communications system of TDMA (Time Division Multiple Access) or FDMA (Frequency Division Multiple Access) was implemented to assign wireless channel of different time or frequency to transceivers. That is, the communications system separates user signals for each transceiver from each other according to time or frequency.

However, in the communications system, rest signals except desired one signal among user signals can operate as an interference signal in a specific receiver. That is, base station is tightly established to increase a frequency reuse factor so as to enhance capacity in the communications system. Hence, a plurality of user signals can exist in a specific wireless channel. Thus, user signals operate as a mutual interference signal so that the reception ability of the receivers can be degraded. Accordingly, it is required to eliminate an interference signal in the communications system.

SUMMARY OF THE INVENTION

The present invention has been made in view of the above problems, and provides a receiver, a method of canceling interference thereof and a transmitter for the same.

In accordance with an aspect of the present invention, a method for receiving feedback information of a transmitter in a mobile communication system is provided. The method includes determining a parameter related to a first user signal; transmitting the first user signal based on the parameter related to the first user signal to a receiver; and receiving feedback information associated with the first user signal and an interference signal based on the first user signal.

In accordance with another aspect of the present invention, a method for transmitting feedback information of a receiver in a mobile communication system is provided. The method includes receiving, from a transmitter, a first user signal based on a parameter related to the first signal determined by the transmitter; generating feedback information associated with the first user signal and an interference signal based on the first user signal; and transmitting the generated feedback information to the transmitter.

In accordance with another aspect of the present invention, a transmitter for receiving feedback information in a mobile communication system is provided. The transmitter includes a radio frequency unit for communicating with a receiver; and a controller configured to determine a parameter related to a first user signal and to control the radio frequency unit to transmit the first user signal based on the parameter related to the first user signal to the receiver, and receive feedback information associated with the first user signal and an interference signal based on the first user signal.

In accordance with another aspect of the present invention, a receiver for transmitting feedback information in a mobile communication system is provided. The receiver includes a radio frequency unit for communicating with a transmitter; and a controller configured to control the radio frequency unit to receive a first user signal based on a parameter related to the first signal determined by a transmitter from the transmitter, and to generate feedback information associated with the first user signal and an interference signal based on the first user signal, and to control the radio frequency unit to transmit the generated feedback information to the transmitter.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In below description, a term "user signal" refers to a signal which is transmitted in a specific transmitter of communications system and is desired to be received in a specific receiver. A term "interference signal" refers to a signal which is transmitted in a specific transmitter of communications system and is not desired to be received in a specific receiver. That is, the interference signal is a signal which is received in a specific receiver while it is a signal which is not desired to be received in a corresponding receiver, and it operates on the user signal of a corresponding receiver as interference. A term "user phase information" refers to location or state related information of user signal, when transmitting a user signal in a specific transmitter of communications system. A term "interference phase information" refers to location or state related information of interference signal, when transmitting an interference signal in another transmitter of communications system. At this time, the user phase information and the interference phase information can be expressed with a complex vector in a complex space which is made of real axis (Re) and imaginary axis (Im).

Figure 1:
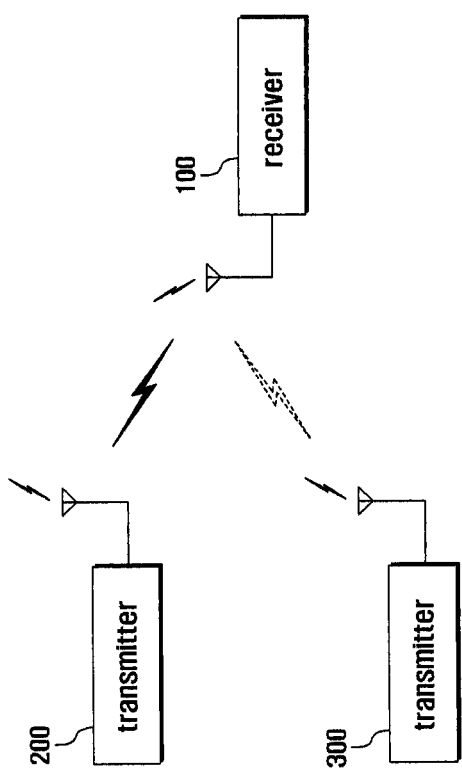
FIG. 1 is a block diagram illustrating a schematic configuration of a communications system according to an exemplary embodiment of the present invention.

FIG. 1 is a block diagram illustrating a schematic configuration of a communications system according to an exemplary embodiment of the present invention.

Referring to FIG. 1, the communications system of the present embodiment includes a plurality of receivers 100 and transmitters 200, 300.

The receiver 100 receives user signal of a specific wireless channel. At this time, the receiver 100 receives not only user signal but also interference signal, when interference signal exists together with user signal in a corresponding wireless channel. After removing interference signal, the receiver 100 processes user signal. That is, the receiver 100 can detect user phase information of user signal and interference phase information of interference signal. Moreover, the receiver 100 rotates user phase information and interference phase information in a complex space to eliminate interference signal. Transmitters 200, 300 transmit user signal or interference signal through a specific wireless channel. That is, in the receiver 100, a specific transmitter 200 transmits user signal and another transmitter 300 transmits interference signal. At this time, the transmitter 200 changes user signal and transmits it so as to efficiently eliminate interference signal in the receiver 100. Here, the transmitter 100 changes user phase information of user signal and transmits it. The receiver 100 in the communications system is illustrated in detail in below.

Figure 2:
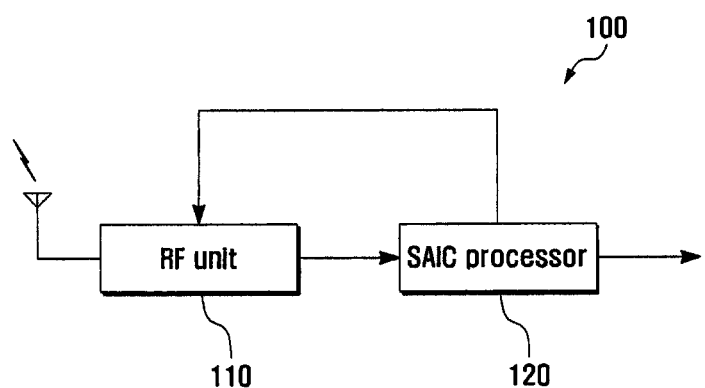
FIG. 2 is a block diagram illustrating an internal configuration of a receiver in FIG. 1.
Figure 3:
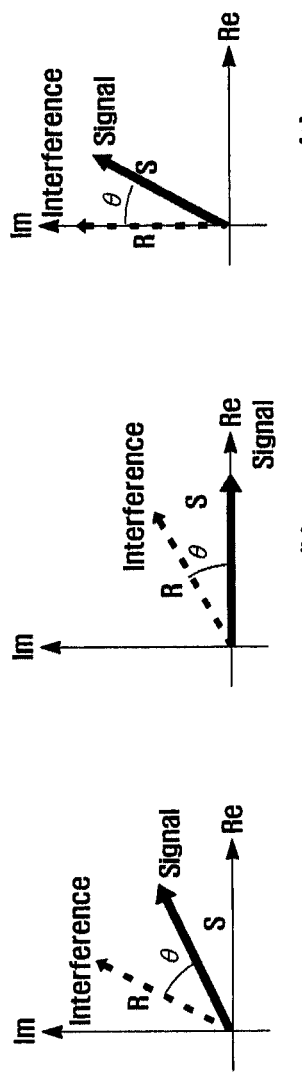
FIG. 3 is a drawing illustrating interference cancellation of FIG. 2.

FIG. 2 is a block diagram illustrating an internal configuration of a receiver in FIG. 1, and FIG. 3 is a drawing illustrating interference cancellation of FIG. 2.

Referring to FIG. 2, the receiver 100 of the embodiment includes a radio frequency unit (RF unit) 110 and a single antenna interference cancellation processor (SAIC processor) 120. The RF unit 110 performs a communication function of the receiver 100. In a predefined wireless channel, this RF unit 110 receives user signal (Signal) and interference signal (Interference). The SAIC processor 120 performs a function for improving the communications performance of the receiver 100. This SAIC processor 120 detects user phase information and interference phase information and classifies the user signal and the interference signal. The SAIC processor 120 feeds back the user phase information and the interference phase information to the transmitter 200 through the RF unit 110. Moreover, the SAIC processor 120 eliminates the interference signal. That is, the SAIC processor 120 amplifies user signal or damps the interference signal, thereby relatively eliminating the interference signal. For example, as shown in FIG. 3(a), the SAIC processor 120 can detect the user phase information of user signal and the interference phase information of interference signal in the complex space. That is, the SAIC processor 120 can detect the size of the user signal as 'S', and detect the size of the interference signal as 'R'. And the SAIC processor 120 can detect the phase difference of the user phase information and the interference phase information as 'θ'. At this time, the Signal-to-Interference-plus-Noise Ratio (SINR) can be determined like equation (1):

$$SINR_i = \frac{S}{R+N} \quad (1)$$

Here, $SINR_i$ indicates the ratio of the user signal and the interference signal inputted to the SAIC processor 120, and N indicates the size of white noise. As shown in FIG. 3(b), the SAIC processor 120 can rotate the user phase information to contact to real axis in the complex space. The SAIC processor 120 can rotate the interference phase information together with the user phase information. At this time, the SAIC processor 120 maintains the phase difference of the user phase information and the interference phase information as 'θ'. That is, the SAIC processor 120 maintains the size of the user signal as 'S', while damping the size of the interference signal as 'R cos θ'. At this time, the SAIC processor 120 can control the Signal-to-Interference-plus-Noise Ratio like equation (2):

$$SINR_0 = \frac{S}{R\cos\theta + N} \quad (2)$$

Here, $SINR_o$ indicates the ratio of the user signal and the interference signal outputted from the SAIC processor 120. Alternatively, as shown in FIG. 3(c), the SAIC processor 120 can rotate the interference phase information to contact to imaginary axis in the complex space. The SAIC processor 120 can rotate the user phase information together with the interference phase information. At this time, the SAIC processor 120 maintains the phase difference of the user phase information and the interference phase information as 'θ'. That is, the SAIC processor 120 damps the size of the user signal as 'S sin θ', while completely eliminating the size of the interference signal. At this time, the SAIC processor 120 can control the Signal-to-Interference-plus-Noise Ratio like equation (3):

$$SINR_o = \frac{S\sin\theta}{N} \quad (3)$$

At this time, if the phase difference of the user phase information and the interference phase information is 90°, the SAIC processor 120 maintains the size of the user signal as 'S', while completely eliminating the size of the interference signal, because if the SAIC processor 120 rotates the user phase information to contact to real axis, the interference phase information can contact to imaginary axis. Alternatively, if the SAIC processor 120 rotates the interference phase information to contact to imaginary axis, the user phase information can contact to real axis. Here, the phase difference of the user phase information and the interference phase information is 90°, the SAIC processor 120 can control the Signal-to-Interference-plus-Noise Ratio equation (4):

$$SINR_o = \frac{S}{N} \quad (4)$$

In below description, the transmitter 200 in the communications system is illustrated in detail.

Figure 4:
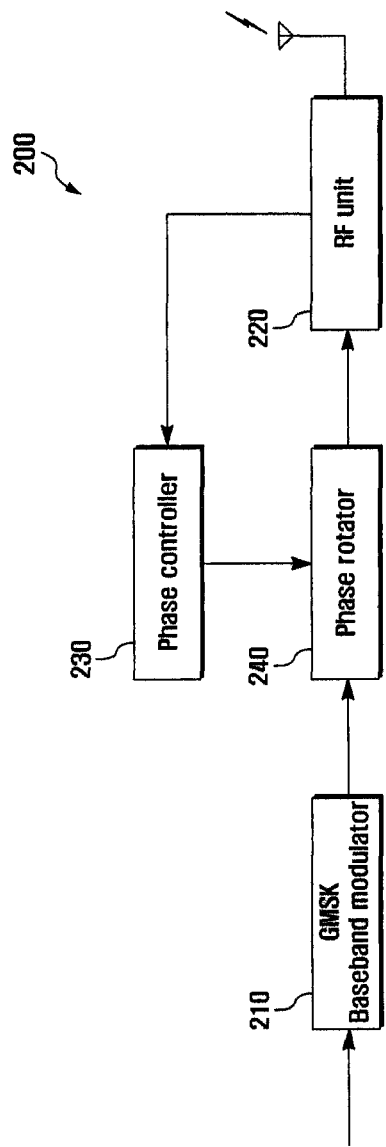
FIG. 4 is a block diagram illustrating an internal configuration of a transmitter in FIG. 1.
Figure 5:
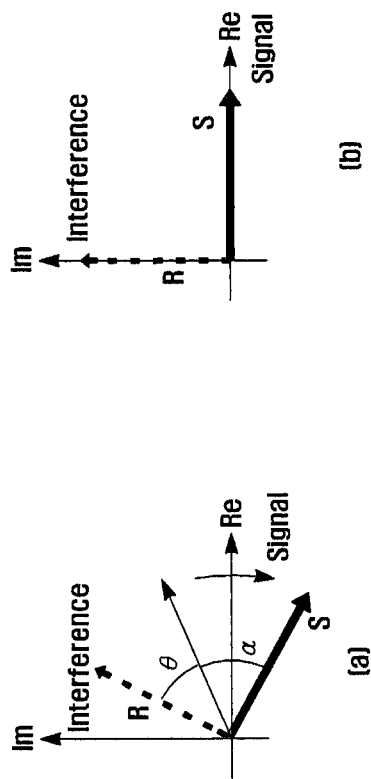
FIG. 5 is a drawing illustrating the interference cancellation of FIG. 4.

FIG. 4 is a block diagram illustrating an internal configuration of a transmitter in FIG. 1, and FIG. 5 is a drawing illustrating the interference cancellation of FIG. 4.

Referring to FIG. 4, the transmitter 200 of the embodiment includes a modulator 210, a RF unit 220, a phase controller 230 and a phase rotator 240. The modulator 210 performs a function of generating a user signal. At this time, the modulator 210 modulates the user signal with the Gaussian minimum shift keying (GMSK). The RF unit 220 performs the telecommunication function of the transmitter 200. This RF unit 220 transmits user signal through a predefined wireless channel. And the RF unit 220 receives user phase information and interference phase information from the receiver 100. The phase controller 230 calculates rotation value for separating user phase information from interference phase information by a preset difference. At this time, the difference may be 90°, and the phase controller 230 can calculate rotation value for controlling the phase difference of the user phase information and the interference phase information to be 90° in the complex space like equation (5).

The phase rotator 240 changes user phase information. That is, the phase rotator 240 rotates user phase information in the complex space as much as rotation value. The phase rotator 240 controls the RF unit 220 to transmit user signal according to user phase information.

$$\alpha = 90 - \theta \quad (5)$$

Here, α indicates rotation value.

For instance, when the receiver 100 receives user phase information and interference phase information, the transmitter 200, as shown in FIG. 5(*a*), rotates user phase information and transmits user signal. When receiving user signal, as shown in FIG. 5(*b*), the receiver 100 rotates user phase information and interference phase information and eliminates interference signal. At this time, since the phase difference of the user phase information and the interference phase information is 90°, the receiver 100 maintains the size of user signal as 'S', while completely eliminating the size of interference signal. The interference cancellation procedure performed in the communications system having such configuration is illustrated.

Figure 6:
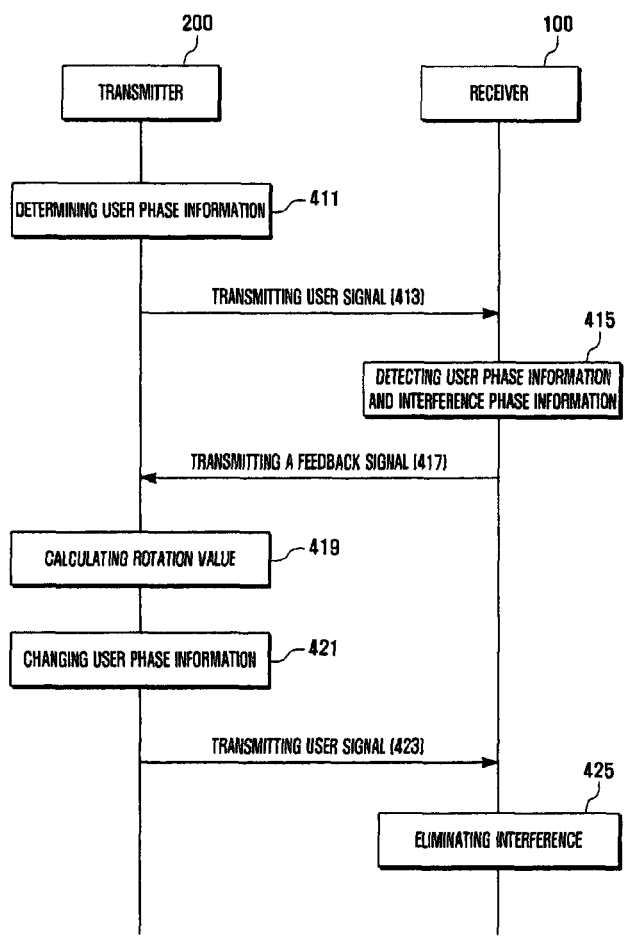
FIG. 6 is a flowchart illustrating an interference cancellation procedure in a communications system according to an exemplary embodiment of the present invention.

FIG. 6 is a flowchart illustrating an interference cancellation procedure in a communications system according to an exemplary embodiment of the present invention.

Referring to FIG. 6, in the interference cancellation procedure of the embodiment, the transmitter 200 determines user phase information (411). The transmitter 200 transmits user signal through user phase information (413). When receiving user signal, the receiver 100 detects user phase information of user signal (415). Here, although not illustrated, the receiver 100 can receive the interference signal of other transmitter 300 independently of user signal. At this time, when receiving the interference signal, the receiver 100 detects the interference phase information of the interference signal at step 415. Moreover, the receiver 100 transmits a feedback signal including the user phase information and the interference phase information (417).

Next, when receiving a feedback signal, the transmitter 200 calculates rotation value for separating user phase information from interference phase information by a preset difference (419). At this time, the difference may be 90°, and the transmitter 200 can calculate rotation value for controlling the phase difference of the user phase information and the interference phase information to be 90° in the complex space. The transmitter 200 changes user phase information by using rotation value (421). That is, the transmitter 200 rotates user phase information in the complex space as much as rotation value. In addition, the transmitter 200 transmits user signal according to user phase information (423). Then, when receiving a user signal, the receiver 100 eliminates interference (425). At this time, the receiver 100 rotates user phase information and interference phase information and eliminates interference. Here, since the phase difference of the user phase information and the interference phase information and is 90°, the receiver 100 can completely eliminate the size of the interference signal while maintaining the size of user signal. In the meantime, it was illustrated that a transmitter of communications system of the above-described embodiment transmits a user signal for a single receiver, but it is not limitative. That is, the present invention can be implementation even when a transmitter transmits a plurality of user signals for a plurality of receivers through a specific wireless channel in a communications system.

Figure 7:
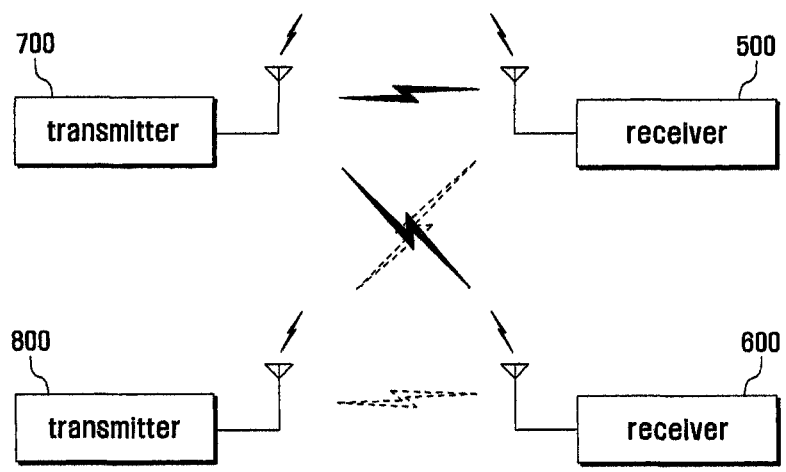
FIG. 7 is a block diagram illustrating a schematic configuration of a communications system according to another exemplary embodiment of the present invention.

FIG. 7 illustrates such an example, and FIG. 7 is a block diagram illustrating a schematic configuration of a communications system according to another exemplary embodiment of the present invention. At this time, transmitter can transmit user signals through a Multi-User Reusing One Slot (MUROS) technique.

Referring to FIG. 7, the communications system of the embodiment includes a plurality of receivers 500, 600 and transmitters 700, 800. Receivers 500, 600 receive the user signal of a specific wireless channel. At this time, receivers 500, 600 can receive each user signal in the same wireless channel. Receivers 500, 600 receive not only each user signal but also interference signal, when interference signal exists with user signal in a corresponding wireless channel.

After eliminating interference signal, receivers 500, 600 process each user signal. That is, receivers 500, 600 can detect the user phase information of user signal and the interference phase information of interference signal. Moreover, receivers 500, 600 can rotate user phase information and interference phase information in a complex space, and eliminate interference signal. Transmitters 700, 800 transmit user signal or interference signal through a specific wireless channel. That is, in the receivers 500, 600, a specific transmitter 700 transmits user signal, and other transmitter 800 transmits interference signal. At this time, the transmitter 700 transmits user signal to the receivers 500, 600 through a specific wireless channel while transmitting user signal through user phase information which is different for respective receivers 500, 600.

Here, the transmitter 700 can transmit user signal by controlling the phase difference of user phase information for respective receivers 500, 600 to be 90°. The transmitter 700 changes user signal to efficiently eliminate interference signal in the receivers 500, 600 and transmits it. At this time, the transmitter 700 changes the user phase information of user signal and transmits it. Here, the transmitter 700 maintains the phase difference of user phase information for respective receivers 500, 600 as 90°. At this time, receivers 500, 600 in the communications system are illustrated in detail.

Figure 8:
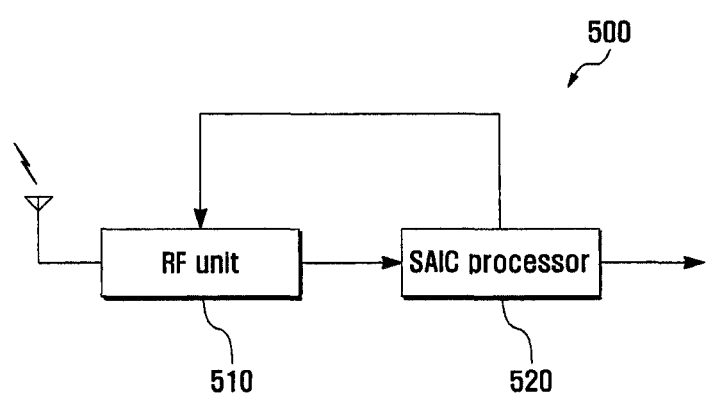
FIG. 8 is a block diagram illustrating an internal configuration of a receiver in FIG. 7.
Figure 9:
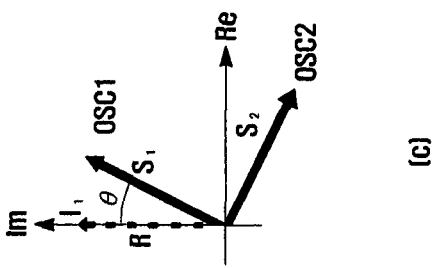
FIG. 9 is a drawing illustrating the interference cancellation of FIG. 8.
Figure 9:
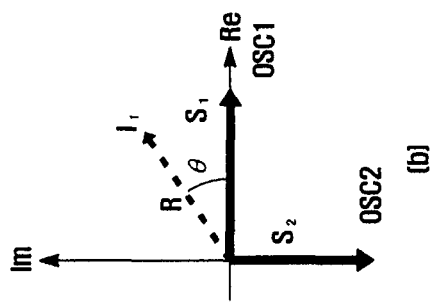
Figure 9:
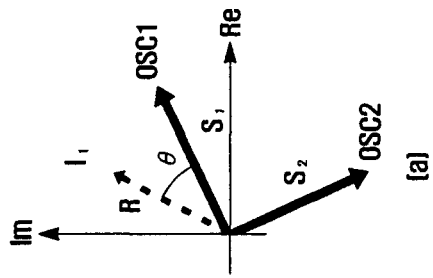

FIG. 8 is a block diagram illustrating an internal configuration of a receiver in FIG. 7, and FIG. 9 is a drawing illustrating the interference cancellation of FIG. 8.

Referring to FIG. 8, a first receiver 500 of the embodiment includes a RF unit 510 and a single antenna interference cancellation processor (SAIC processor) 520. The RF unit 510 performs a telecommunication function of a first receiver 500. Such RF unit 510 receives a first user signal i.e., Orthogonal Sub-Channel signal 1 (OSC1) and a first interference signal ($I_1$) in a predefined wireless channel. At this time, the RF unit 510 can more receive a second user signal i.e., Orthogonal Sub-Channel signal 2 (OSC2) in a corresponding wireless channel.

The SAIC processor 520 performs a function for improving the communications performance of the receiver 500. This SAIC processor 520 can detect first user phase information and first interference phase information, and classify the OSC1 and the first interference signal. At this time, the SAIC processor 520 can detect second user phase information, and classify the OSC1, the first interference signal, and the OSC2. The SAIC processor 520 feeds back first user phase information and first interference phase information to the transmitter 700 through the RF unit 510. Moreover, the SAIC processor 520 eliminates the first interference signal. At this time, the SAIC processor 520 can more eliminate the OSC2. That is, the SAIC processor 520 amplifies the OSC1 or damps the first interference signal, thereby relatively eliminating the first interference signal. For instance, as shown in FIG. 9(*a*), the SAIC processor 520 can detect the first user phase information of OSC1 and the first interference phase information of first interference signal in a complex space. At this time, the SAIC processor 520 can more detect the second user phase information of OSC2. That is, the SAIC processor 520 can detect the size of the OSC1 as '$S_1$', detect the size of the first interference signal as '$R_1$', and detect the size of the OSC2 as '$S_2$'. In addition, the SAIC processor 520 can detect the phase difference of the first user phase information and the first interference phase information as 'θ'. At this time, the ratio of the size of the OSC1 to the first interference signal and the OSC2 is determined like equation (6):

$$SINR_i^1 = \frac{S_1}{R_1 + N_1 + S_2} \quad (6)$$

Here, $SINR_i^1$ indicates the ratio of the user signal and the interference signal inputted from the first receiver 500 to the SAIC processor 520, and N1 indicates the size of white noise in the first receiver 500. As shown in FIG. 9(*b*), the SAIC processor 520 can rotate the first user phase information to contact to real axis in a complex space. The SAIC processor 520 can rotate the first interference phase information and the second user phase information together with the first user phase information.

At this time, the SAIC processor 520 maintains the phase difference of the first user phase information and the first interference phase information as 'θ'. Moreover, the SAIC processor 520 maintains the phase difference of the first user phase information and the second user phase information as '90°'. That is, the SAIC processor 520 maintains the size of the first user signal as '$S_1$', while damping the size of the first interference signal as '$R_1 \cos θ$'. Moreover, since the second user phase information contacts to imaginary axis, the SAIC processor 520 completely eliminates the size of the OSC2, so that the OSC2 and the first interference signal can be prevented from being operated as interference. At this time, the SAIC processor 520 can control the ratio of the size of OSC1 to the size of the first interference signal and the OSC2 like equation (7):

$$SINR_o^1 = \frac{S_1}{R_1 \cos θ + N_1} \quad (7)$$

Here, $SINR_o^1$ indicates the ratio of the user signal and the interference signal outputted from the SAIC processor 520.

Alternatively, as shown in FIG. 9(*c*), the SAIC processor 520 can rotate the first interference phase information to contact to imaginary axis in an imaginary space. The SAIC processor 520 can rotate the first user phase information and the second user phase information together with the first interference phase information. At this time, the SAIC processor 520 maintains the phase difference of the first user phase information and the first interference phase information as 'θ'. Moreover, the SAIC processor 520 maintains the phase difference of the first user phase information and the second user phase information as '90°'. That is, the SAIC processor 520 damps the size of the first user signal as '$S_1 \sin θ$', while completely eliminating the size of the first interference signal. Moreover, since the second user phase information contacts to imaginary axis, the SAIC processor 520 completely eliminates the size of the OSC2, so that the OSC2 and the first interference signal can be prevented from being operated as interference. At this time, the SAIC processor 520 can control the ratio of the size of OSC1 to the size of the first interference signal and the OSC2 like equation (8):

$$SINR_o^1 = \frac{S_1 \sin θ}{N_1} \quad (8)$$

At this time, if the phase difference of the first user phase information and the first interference phase information is 90°, the SAIC processor 520 maintains the size of the OSC1 as '$S_1$', while completely eliminating the size of the first interference signal and the OSC2, because if the SAIC processor 520 rotates the first user phase information to contact to real axis, the first interference phase information and the second user phase information can contact to imaginary axis. Alternatively, if the SAIC processor 520 rotates the first interference phase information to contact to imaginary axis, the first user phase information can contact to real axis and the second user phase information can contact to imaginary axis. Here, the phase difference of the first user phase information and the first interference phase information is 90°, the SAIC processor 520 can control the ratio of the size of OSC1 to the size of first interference signal and OSC2 like equation (9):

$$SINR_o^1 = \frac{S_1}{N_1} \quad (9)$$

In the meantime, since the basic configuration of the second receiver 600 of the embodiment is similar to a corresponding configuration of the first receiver 500, the detailed description is omitted. However, the second receiver 600 operates to eliminate the size of the second interference signal, i.e., 'R₂', and the size of the OSC1 i.e., 'S₁'. For example, the second receiver 600 operates to maintain the size of the OSC2 as 'S₂', while completely eliminating the size of the second interference signal, i.e., 'R₂', and the size of the OSC1 i.e., 'S₁'. The transmitter 700 of the communications system is illustrated in detail.

Figure 10:
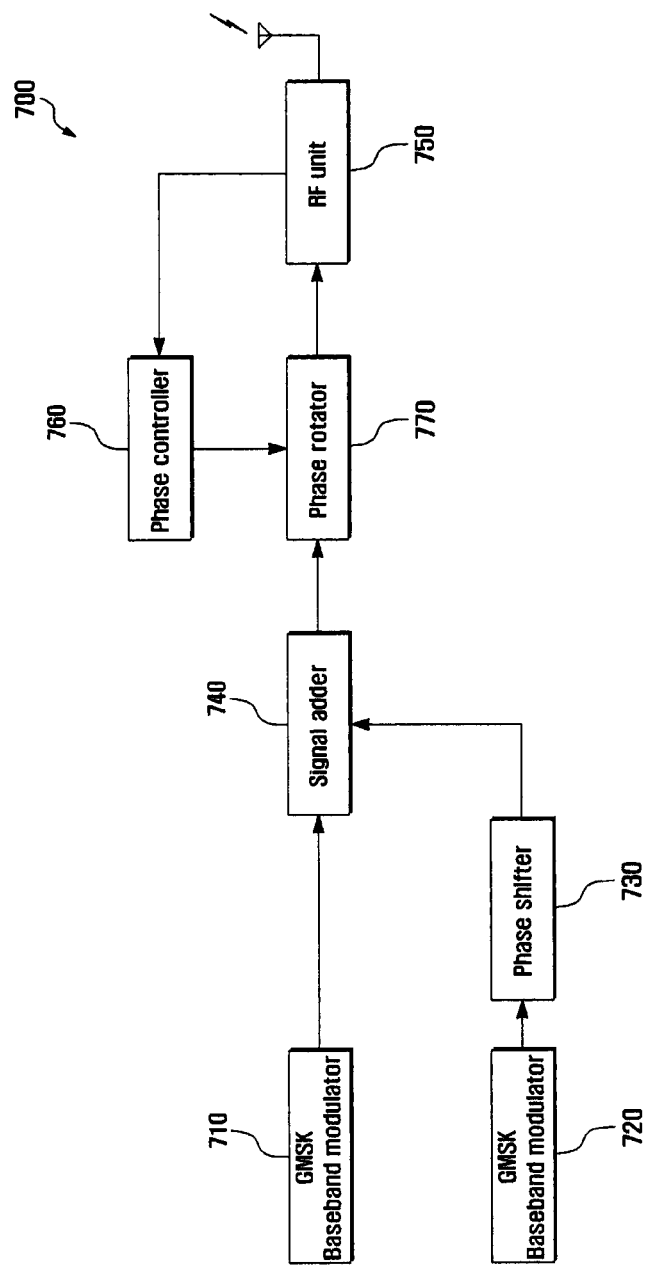
FIG. 10 is a block diagram illustrating an internal configuration of the transmitter in FIG. 7.
Figure 11:
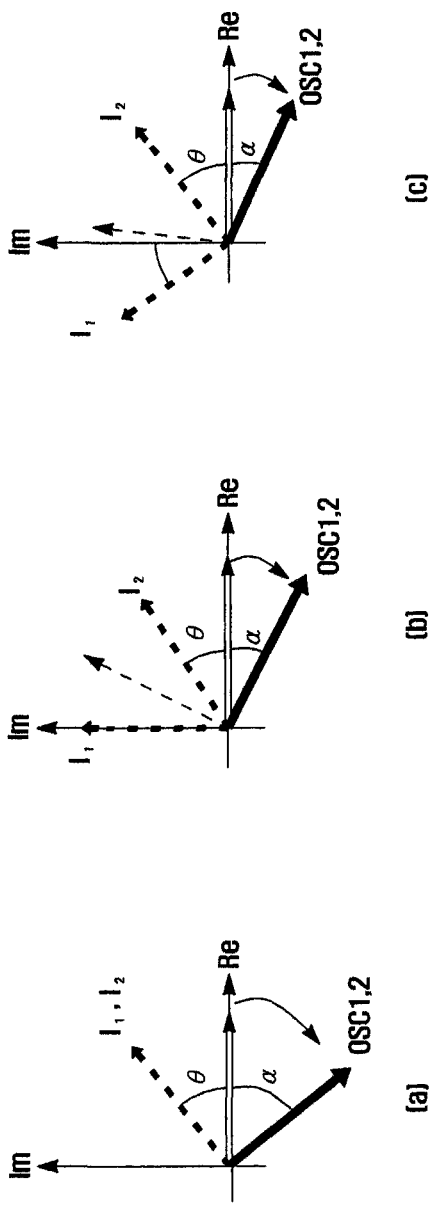
FIG. 11 is a drawing illustrating the interference cancellation of FIG. 10.

FIG. 10 is a block diagram illustrating an internal configuration of the transmitter in FIG. 7. FIG. 11 is a drawing illustrating the interference cancellation of FIG. 10.

Referring to FIG. 10, the transmitter 700 of the embodiment includes a first modulator 710, a second modulator 720, a phase shifter 730, a signal adder 740, a RF unit 750, a phase controller 760, and a phase rotator 770. The first modulator 710 performs a function of generating OSC1 for a first receiver 500. At this time, the first modulator 710 modulates the OSC1 with the Gaussian minimum shift keying (GMSK). The second modulator 720 performs a function of generating OSC2 for a second receiver 600. At this time, the second modulator 720 modulates the OSC2 with the Gaussian minimum shift keying (GMSK). The phase shifter 730 controls second user phase information of the OSC2. That is, the phase shifter 730 controls second user phase information in order to be separated from the first user phase information by 90° in complex space. The signal adder 740 adds the OSC1 and the OSC2 to a predefined wireless channel. The RF unit 750 performs a communication function of the transmitter 700. This RF unit 750 transmits the OSC1 and the OSC2. Moreover, the RF unit 750 receives first user phase information, first interference phase information, second user phase information, and second interference phase information from receivers 500, 600.

The phase controller 760 calculates a rotation value for separating the first user phase information and the second user the phase information from the first interference phase information or the second interference phase information by a preset difference. At this time, the difference can be 90°, and the phase controller 760 calculates a rotation value for controlling the phase difference of the first user phase information and the second user phase information to be maintained by 90°. And the phase controller 760 calculates a rotation value for controlling the phase difference of the first user phase information and the first interference phase information and the phase difference of the second user phase information and the second interference phase information to be approximate 90°. That is, the phase controller 760 calculates a rotation value by comparing first interference phase information with second interference phase information, after normalizing the first user phase information and the second user phase information into a single value.

For instance, if the first interference phase information and the second interference phase information are similar, as shown in FIG. 11(a), the phase controller 760 calculates a rotation value for controlling the phase difference of the first user phase information and the first interference phase information to be 90° in complex space. Alternatively, the phase controller 760 calculates a rotation value for controlling the phase difference of the second user phase information and the second interference phase information to be 90° in complex space. At this time, if the separation value of the first interference phase information and the second interference phase information is a preset critical value or less, the phase controller 760 can determine that the first interference phase information and the second interference phase information are similar. And the phase controller 760 can calculate a rotation value like equation (10):

$$\alpha = 90 - \theta \quad (10)$$

Here, α indicates rotation value.

Alternatively, if the first interference phase information and the second interference phase information are different, as shown in FIG. 11(b), the phase controller 760 calculates a median of the first interference phase information and the second interference phase information. And the phase controller 760 calculates a rotation value for controlling the phase difference of the first user phase information and the median to be 90° in complex space. Alternatively, the phase controller 760 calculates a rotation value for controlling the phase difference of the second user phase information and the median to be 90° in complex space. At this time, if the separation value of the first interference phase information and the second interference phase information exceeds a preset critical value, the phase controller 760 can determine that the first interference phase information and the second interference phase information are different. And the phase controller 760 can calculate a rotation value like equation (11):

$$\alpha = 90 - (\beta + \theta) \quad (11)$$

Here, β indicates the phase difference of the first interference phase information or the second interference phase information and the median. For instance, if the phase difference of the first interference phase information and the second interference phase information is 90°, as shown in FIG. 11(c), the phase controller 760 calculates the median of the first interference phase information and the second interference phase information. That is, the phase controller 760 calculates the median having a phase difference 45° with the first interference phase information or the second interference phase information. And the phase controller 760 calculates a rotation value for controlling the phase difference of the first user phase information to be 90° in complex space. Alternatively, the phase controller 760 calculates a rotation value for controlling the phase difference of the second user phase information and the median to be 90° in complex space. At this time, the phase controller 760 can calculate a rotation value like equation (12):

$$\alpha = 90 - (45 + \theta) \quad (12)$$

The interference cancellation procedure performed in the communications system having such configuration is illustrated.

Figure 12:
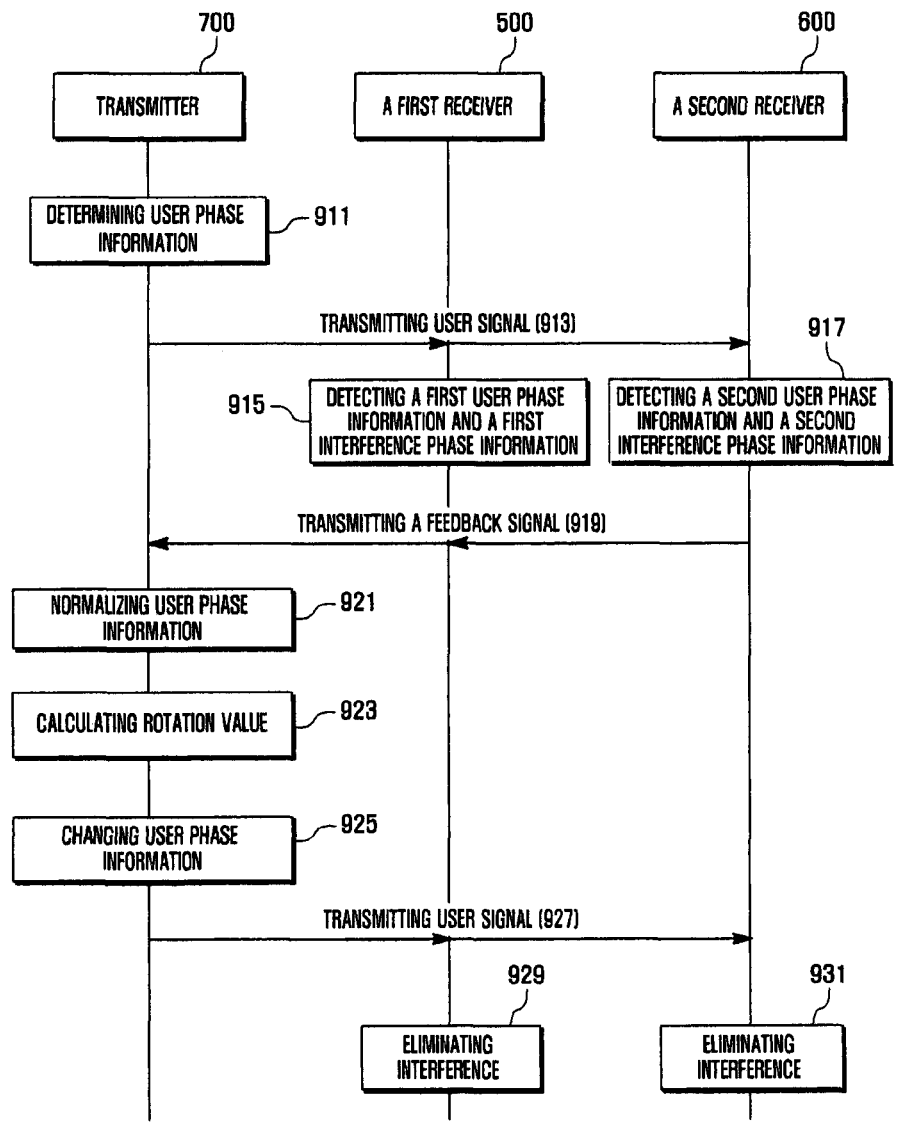
FIG. 12 is a flowchart illustrating a interference cancellation procedure in a communications system according to another exemplary embodiment of the present invention.

FIG. 12 is a flowchart illustrating a interference cancellation procedure in a communications system according to another exemplary embodiment of the present invention.

Referring to FIG. 12, in the interference cancellation procedure of the present embodiment, the transmitter 700 determines user phase information (911). The transmitter transmits a user signal through the user phase information (913). At this time, the transmitter 700 transmits OSC1 for the first receiver 500 through the first user phase information. Moreover, the transmitter 700 transmits OSC2 for the second receiver 600 through the second user phase information. That is, the transmitter 700 controls the phase difference of the first user phase information and the second user phase information to be 90°, and transmits the OSC1 and the OSC2. Thereafter, when receiving the OSC1, the first receiver 500 detects the first user phase information of the OSC1 (915). Here, although not shown, the first receiver 500 can receive the OSC2, independently of the OSC1, and can receive the first interference signal of other transmitter 800. At this time, when receiving the first interference signal, the first receiver 500 detects the first interference phase information of the first interference signal at step 915. Similarly, when receiving the OSC2, the second receiver 600 detects the second user phase information of the OSC2 (917). Here, although not shown, the second receiver 600 can receive the OSC1, independently of the OSC2, and can receive the second interference signal of other transmitter 800. At this time, when receiving the second interference signal, the second receiver 600 detects the second interference phase information of the second interference signal at step 917. Then, the first receiver 500 and the second receiver 600 individually transmit a feedback signal that respectively includes the first user phase information, the first interference phase information, and the second user phase information, the second interference phase information (919). And then, when receiving a feedback signal, the transmitter 700 normalizes user phase information (921). That is, the transmitter 700 normalizes the first user phase information and the second user phase information into a single value. The transmitter 700 calculates a rotation value for separating the user phase information from the median of the first interference phase information and the second interference phase information by a preset difference (923). At this time, the transmitter 700 calculates a rotation value for controlling the phase difference of the user phase information, i.e., the first user phase information or the second user phase information and the median to be 90° in complex space. The transmitter 700 changes the first user phase information and the second user phase information by using a rotation value (925). That is, the transmitter 700 respectively rotates the first user phase information and the second user phase information in complex space by rotation value. Moreover, the transmitter 700 transmits the OSC1 according to the first user phase information, transmits the OSC2 according to the second user phase information (927). Finally, when receiving the OSC1, the first receiver 500 eliminates interference (929). That is, the first receiver 500 can eliminate the first interference signal, and can eliminate the OSC2. At this time, the first receiver 500 rotates the first user phase information, the second user phase information, and the first interference phase information to eliminate interference. Here, since the phase difference of the first user phase information and the first interference phase information, and the first user phase information and the second user phase information are 90° respectively, the first receiver 500 can completely eliminate the size of the first interference signal and the OSC2 while maintaining the size of the OSC1.

And, when receiving the OSC2, the second receiver 600 eliminates interference (931). That is, the second receiver 600 can eliminate the second interference signal, and can eliminate the OSC1. At this time, the second receiver 600 rotates the first user phase information, the second user phase information, and the second interference phase information to eliminate interference. Here, since the phase difference of the second user phase information and the second interference phase information, and the second user phase information and the first user phase information are 90° respectively, the second receiver 600 can completely eliminate the size of the second interference signal and the OSC1 while maintaining the size of the OSC2. In the meantime, in the above-described embodiments, it was illustrated that transmitter uses a feedback signal of receiver to change user phase information. However, it is not limitative. That is, even when transmitter does not use a feedback signal, the present invention can be implemented. Therefore, transmitter does not need to receive user phase information and interference phase information through feedback signal in receiver. For instance, transmitter obtains an arbitrary rotation value in every TDMA frame, so that it can rotate user phase information by rotation value in complex space. In other words, transmitter randomizes the phase difference of the user phase information and the interference phase information, so that it can suppress the operation of the interference signal in receiver.

According to the present invention, in the communications system, transmitter can suppress the operation of the interference signal in receiver. That is, as transmitter changes phase information of user signal in complex space, receiver can completely eliminate interference signal. Accordingly, the link performance between transmitter and receiver can be improved in the communications system. Accordingly, the communications quality between transmitter and receiver can be improved in the communications system, and the communications range can be extended.

Therefore, the receiver, the method of canceling interference thereof and a transmitter for the same according to the present invention can suppress the operation of interference signal. That is, transmitter changes phase information of user signal in a complex space, so that receiver can completely eliminate interference signal. Thus, link performance between transmitter and receiver can be improved in communications system. Accordingly, communications quality between transmitter and receiver can be improved in communications system, and the communications range can be extended.

In the communications system of the present invention, transmitter can suppress the operation of the interference signal in receiver. That is, as transmitter changes phase information of user signal in complex space, receiver can completely eliminate interference signal. Accordingly, the link performance between transmitter and receiver can be improved in the communications system. Accordingly, the communications quality between transmitter and receiver can be improved in the communications system, and the communications range can be extended.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for receiving feedback information of a transmitter in a mobile communication system, the method comprising:

obtaining information associated with a phase of a first signal;

transmitting the first signal based on the information associated with the phase of the first signal to a receiver;

receiving feedback information generated, by the receiver, based on the first signal and an interference signal that is received by the receiver, wherein the feedback information includes information on a phase of the interference signal;

determining a phase of a second signal to be separated from the phase of the interference signal by a preset phase difference for the receiver based on the feedback information to eliminate the interference signal; and transmitting the second signal based on the phase of the second signal to the receiver, wherein the second signal is modulated with Gaussian minimum shift keying (GMSK), wherein determining the phase of the second signal comprises:

calculating a rotation value for making the preset phase difference between the phase of the second signal and the phase of the interference signal 90°; and changing the phase of the second signal based on the calculated rotation value.

2. The method of claim 1, wherein determining the phase of the second signal comprises rotating the phase of the second signal such that the phase of the second signal differs from a phase of the interference signal by 90° in a complex space.

3. A method for transmitting feedback information of a receiver in a mobile communication system, the method comprising:

receiving, from a transmitter, a first signal, wherein the first signal is based on information associated with a phase;

generating feedback information based on the first signal and an interference signal that is received by the receiver, wherein the feedback information includes information on a phase of the interference signal;

transmitting the generated feedback information to the transmitter; and receiving, from the transmitter, a second signal, wherein a phase of the second signal is determined to be separated from the phase of the interference signal by a preset phase difference for the receiver to eliminate the interference signal based on the generated feedback information, wherein the second signal is modulated with Gaussian minimum shift keying (GMSK), and wherein the phase of the second signal is determined based on a rotation value calculated for making the preset phase difference between the phase of the second signal and the phase of the interference signal 90°.

4. The method of claim 3, wherein the phase of the second signal is rotated, by the transmitter, such that the phase of the second signal differs from a phase of the interference signal by 90° in a complex space.

5. A transmitter for receiving feedback information in a mobile communication system, the transmitter comprising:

a radio frequency unit for communicating with a receiver; and a controller configured to:

obtain information associated with a phase of a first signal, control the radio frequency unit to transmit the first signal based on the information associated with the phase of the first signal to the receiver, receive feedback information generated by the receiver based on the first signal and an interference signal that is received by the receiver, wherein the feedback information includes information on a phase of the interference signal, modulate a second signal with Gaussian minimum shift keying (GMSK);

calculate a rotation value for making a preset phase difference between the phase of the first signal and the phase of the interference phase 90°;

determine a phase of the second signal to be separated from the phase of the interference signal by the preset phase difference for the receiver based on the feedback information to eliminate the interference signal, and control the radio frequency unit to transmit the second signal based on the phase of the second signal to the receiver.

6. The transmitter of claim 5, further comprising a phase rotator configured to rotate the phase of the second signal such that the phase of the second signal differs from a phase of the interference signal by 90° in a complex space.

7. A receiver for transmitting feedback information in a mobile communication system, the receiver comprising:

a radio frequency unit for communicating with a transmitter; and a controller configured to:

control the radio frequency unit to receive, from the transmitter, a first signal, wherein the first signal is based on information associated with a phase, generate feedback information associated with the first signal and an interference signal that is received by the receiver, wherein the feedback information includes information on a phase of the interference signal, control the radio frequency unit to transmit the generated feedback information to the transmitter, and receive, from the transmitter, a second signal, wherein a phase of the second signal is determined to be separated from the phase of the interference signal by a preset phase difference for the receiver to eliminate the interference signal based on the generated feedback information, wherein the second signal is modulated with Gaussian minimum shift keying (GMSK), and wherein the preset phase difference is determined based on a rotation value calculated for making the preset phase difference between the phase of the second signal and the phase of the interference signal 90°.

8. The receiver of claim 7, wherein the phase of the second signal is rotated, by the transmitter, such that the phase of the second signal differs from a phase of the interference signal by 90° in a complex space.

* * * * *